United States Patent
Seidel et al.

(10) Patent No.: US 9,670,360 B2
(45) Date of Patent: Jun. 6, 2017

(54) EMULSION POLYMER CONTAINING COMPOUNDS WITH IMPROVED SURFACE AFTER STORAGE UNDER WARM AND HUMID STORAGE

(71) Applicant: Covestro Deutschland AG, Leverkusen (DE)

(72) Inventors: Andreas Seidel, Dormagen (DE); Martin Doebler, Duesseldorf (DE); Hans-Juergen Thiem, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/390,601

(22) PCT Filed: Mar. 20, 2013

(86) PCT No.: PCT/EP2013/055800
§ 371 (c)(1),
(2) Date: Oct. 3, 2014

(87) PCT Pub. No.: WO2013/160029
PCT Pub. Date: Oct. 31, 2013

(65) Prior Publication Data
US 2015/0065623 A1 Mar. 5, 2015

(30) Foreign Application Priority Data

Apr. 23, 2012 (EP) .................... 12165143

(51) Int. Cl.
*C08L 69/00* (2006.01)
*C08L 51/04* (2006.01)
*C08F 257/02* (2006.01)

(52) U.S. Cl.
CPC .......... *C08L 69/00* (2013.01); *C08F 257/02* (2013.01); *C08L 51/04* (2013.01); *C08L 2205/025* (2013.01); *C08L 2205/035* (2013.01)

(58) Field of Classification Search
CPC .................................................. C08F 257/02
See application file for complete search history.

(56) References Cited

U.S. PATENT DOCUMENTS

| | | | |
|---|---|---|---|
| 6,983,542 B2* | 1/2006 | Mithal | C23C 14/205 30/322 |
| 8,383,709 B2 | 2/2013 | Eckel et al. | |
| 2010/0190913 A1* | 7/2010 | Seidel | C08L 55/02 524/508 |
| 2010/0227965 A1 | 9/2010 | Duijzings et al. | |
| 2010/0267889 A1 | 10/2010 | Seidel et al. | |
| 2010/0292385 A1* | 11/2010 | Fischer | B29C 45/0001 524/439 |

FOREIGN PATENT DOCUMENTS

| | | | |
|---|---|---|---|
| DE | 103 53 952 A1 | 6/2005 | |
| EP | 0006503 B1 | 7/1982 | |
| EP | 1341830 B1 | 1/2006 | |
| EP | 2219843 B1 | 8/2012 | |
| EP | 2657259 A1 | 10/2013 | |
| WO | WO 9118052 A1 * | 11/1991 | C08L 69/00 |
| WO | 2008064933 A1 | 6/2008 | |
| WO | 2008138534 A2 | 11/2008 | |
| WO | 2009071537 A2 | 6/2009 | |
| WO | 2011131727 A1 | 10/2011 | |

OTHER PUBLICATIONS

International Search Report from corresponding PCT/EP2013/055800, mailed Jul. 7, 2013.

* cited by examiner

Primary Examiner — Wenwen Cai
(74) Attorney, Agent, or Firm — K&L Gates LLP

(57) ABSTRACT

The invention relates to polymer compounds containing A) 0 to 98 parts by weight, based on the sum of A and B, of a thermoplastic polymer, or a mixture of a plurality of thermoplastic polymers differing from B, and B) 2 to 100 parts by weight, based on the sum of A and B, of B 1) at least one graft polymer produced by an emulsion polymerisation process, B2) optionally at least one graft polymer produced in a mass, suspension or solution polymerisation process, B3) optionally at least one rubber-free vinyl (co)polymer and (C) 0 to 30 parts by weight of at least one commercially available polymer additive, wherein the total of parts by weight A and B is 100.

18 Claims, No Drawings

EMULSION POLYMER CONTAINING COMPOUNDS WITH IMPROVED SURFACE AFTER STORAGE UNDER WARM AND HUMID STORAGE

CROSS REFERENCE TO RELATED APPLICATIONS

This application is a §371 National Stage Application of PCT/EP2013/055800, filed Mar. 20, 2013, which claims priority to EP 12165143.4, filed Apr. 23, 2012.

BACKGROUND

Field of the Invention

The present invention relates to thermoplastic compositions comprising vinylaromatic (rubber-modified) copolymers prepared by the emulsion polymerization process and precipitated with an alkaline earth metal salt, preferably with magnesium sulfate, which as a result of the preparation comprise residues or the total amount of the salt used for the precipitation, wherein the moldings prepared from the compositions are characterized by an improved surface quality after storage under warm humid conditions. The moldings preferably have a class A surface, free of visual defects and stable to aging under these conditions.

Description of Related Art

The present invention also relates to a method for preparing compositions according to the invention, the use of the inventive compositions for preparing moldings and also moldings which were prepared from the inventive compositions.

The compositions comprising vinylaromatic (rubber-modified) copolymers prepared by the emulsion polymerization process, which as a result of the preparation contain salt inclusions, are known from the literature. Sources of such salt inclusions as a result of the preparation are manifold, for example, emulsifying solutions, polymerization initiator solutions, buffer solutions and particularly precipitating solutions used in the emulsion polymerization process as auxiliaries, which, depending on the method, remain in the material or are only incompletely removed again from the material during the work-up of the polymer.

Particularly in traditional preparation methods, the precipitation of vinyl polymer lattices, by means of addition of acids and/or salts, prepared by emulsion polymerization described, for example, in EP 459 161 B1, DE 2 021 398 and DE 28 15 098, contribute to the salt burden of the final polymer to a considerable degree, since removal of these salts again from the product via downstream method steps (washing) is generally possible only to an inadequate degree and/or at high cost (energy and water/waste water). The coagulants used are, for example, and preferably, aqueous solutions of water-soluble salts such as alkali metal, alkaline earth metal or aluminum chlorides, sulfates, nitrates, phosphates, acetates, formates, aluminates or carbonates, particularly preferably aluminum chloride, calcium chloride and magnesium sulfate solutions, optionally in combination with inorganic or organic acids such as hydrochloric acid, sulfuric acid, phosphoric acid, boric acid, formic acid, acetic acid, propionic acid and citric acid.

It is described in the literature that such salt inclusions in compositions comprising vinylaromatic rubber-modified copolymers can lead to undesired effects. This is known in particular for compositions comprising vinylaromatic copolymers in which the vinylaromatic copolymer has been precipitated with an alkaline earth metal salt, preferably selected from the group of magnesium and/or calcium sulfates or chlorides, particularly preferably selected from magnesium sulfate and calcium chloride, especially preferably magnesium sulfate, in basic media, i.e. preferably in the absence of an inorganic or organic acid.

Base-precipitated vinylaromatic rubber-modified copolymers, in contrast to those precipitated with acid, have the advantage that these contribute less markedly to hydrolysis and processing instability during processing in a polycarbonate blend using acidic stabilizers (cf. EP 2373743).

By way of example, WO 2009/071537 discloses that magnesium compounds and/or calcium compounds in impact-modified vinylaromatic copolymers selected from the group of the acrylonitrile-butadiene-styrene copolymers (ABS), acrylonitrile-styrene-acrylate-copolymers (ASA) and methacrylate-acrylonitrile-butadiene-styrene copolymers (MABS), optionally comprising polycarbonate and additives, lead to undesired deposit formation on the shaping mold during thermoplastic shaping via injection molding or extrusion, and to that extent claims compositions of this type having a content of magnesium compounds and/or calcium compounds of 0 mg/kg to 100 mg/kg. The emulsion polymers used in said compositions are usually precipitated by freeze precipitation in a flake-ice machine, rather than by the conventional addition of magnesium sulfate solution.

WO 98/28344 discloses a method for the continuous coagulation of aqueous dispersions of graft rubbers via shear, which overcomes the known disadvantage of precipitation by means of acids and/or salts as coagulants, that contaminants often remain in the work-up polymers, and these can lead to impairment of product properties.

One problem with thermoplastic compositions comprising vinylaromatic copolymers prepared by the emulsion polymerization process with salt inclusions resulting from the preparation is that when moldings produced from these are exposed to moisture (for example condensation or humidity), particularly at elevated temperatures, they are susceptible to undesired development of surface defects (blistering), which restrict the use of compositions of this type in moldings with high-gloss finish and Class A surface requirement.

SUMMARY

The object of the present invention, therefore, was to provide thermoplastic compositions comprising vinylaromatic rubber-modified copolymers prepared by the emulsion polymerization process, in which the vinylaromatic rubber-modified copolymer has been precipitated with at least one alkaline earth metal salt, preferably selected from the group of magnesium sulfates, calcium sulfates, magnesium chlorides and calcium chlorides, particularly preferably selected from magnesium sulfate and calcium chloride, especially preferably magnesium sulfate, in basic medium, preferably in the absence of an inorganic or organic acid, wherein the thermoplastic compositions, despite the salt burden remaining in the emulsion polymer as a result of the preparation process, are characterized by an improved surface quality of the moldings prepared therefrom after storage under warm humid conditions at 40° C. and 95% relative humidity, in a preferred embodiment also at 90° C. and 95% relative humidity, and are suitable for preparing moldings having a Class A surface stable to aging under these conditions, with no visually disruptive, preferably no visible blister defects.

"Visually non-disruptive blister defects" are understood to mean those which give rise to an evaluation of "1S1" with respect to size and density in accordance with DIN EN ISO 4628-2. Surfaces with no visible blister defects are those which have been assessed with a valuation of "0" according to DIN EN ISO 4628-2.

Surfaces with visually non-disruptive blister defects in the context of the present invention are understood to mean those surfaces preferably not having blisters with a diameter of more than 300 μm, preferably not more than 240 μm, particularly preferably not more than 200 μm.

It has now been found, surprisingly, that polymer compositions meet this objective, comprising
- A) 0 to 98 parts by weight, preferably 1 to 95 parts by weight, especially 30 to 85 parts by weight, based on the sum total of A and B, of a thermoplastic polymer or a mixture of a plurality of thermoplastic polymers different from B and
- B) 2 to 100 parts by weight, preferably 5 to 99 parts by weight, particularly preferably 15 to 70 parts by weight, based on the sum total of A and B, of
  - B1) at least one graft polymer prepared by the emulsion polymerization process,
  - B2) optionally at least one graft polymer prepared by the bulk, suspension or solution polymerization process,
  - B3) optionally at least one rubber-free vinyl (co)polymer and
- C) 0 to 30 parts by weight, preferably 0.1 to 20 parts by weight, especially 0.3 to 7 parts by weight, based on the sum total on A and B, of at least one commercially available polymer additive, wherein the sum total of parts by weight A and B is 100, characterized in that
  (i) the graft polymer prepared by the emulsion polymerization process in accordance with component B1 was precipitated with at least one alkaline earth metal salt selected from the group of magnesium or calcium salts, preferably selected from the group consisting of magnesium sulfate, magnesium chloride, calcium sulfate and calcium chloride, particularly preferably selected from the group consisting of magnesium sulfate and calcium chloride, most preferably magnesium sulfate, in basic medium (pH>7), i.e. preferably without addition of an inorganic or organic Brönsted acid in the precipitation step, and
  (ii) the graft polymer prepared by the emulsion polymerization process in accordance with component B1 comprises, as a result of the preparation, at least one sodium salt and at least one alkaline earth metal salt in accordance with (i), preferably a sodium salt and a magnesium salt, wherein the metal ions are present in a molar ratio Na/(Mg+Ca), or in a preferred embodiment in a molar ratio Na/Mg, of at least 0.10, preferably at least 0.15, particularly preferably at least 0.20, especially at least 0.25. The molar ratio in question is preferably at most 1.0, more preferably at most 0.8 and particularly preferably at most 0.5.

DETAILED DESCRIPTION OF A PREFERRED EMBODIMENT

The molar ratio of Na/(Mg+Ca) or Na/Mg is determined according to the formulae

Na/(Mg+Ca)=(content of Na in ppm/molar mass of Na)/[(content of Mg in ppm/molar mass of Mg)+(content of Ca in ppm/molar mass of Ca)]

or

Na/Mg=(content of Na in ppm/molar mass of Na)/ [(content of Mg in ppm/molar mass of Mg).

In a preferred embodiment, the composition consists only of the components A, B and C.

In another preferred embodiment, component B comprises at least two components selected from the group consisting of B1, B2 and B3, more preferably of components B1 and B3, particularly preferably of B1, B2 and B3.

The alkaline earth metal salts are introduced into the method and thus into the product during the preparation of component B1, preferably mainly as precipitant via the precipitation process and are not, or not completely, removed from the product again in the subsequent work-up steps (filtration, decanting and/or centrifugation of the coagulate/water mixture, washing of the coagulate, drying of the coagulate).

The sodium is introduced into the method during the preparation of component B1, preferably in the form of a sodium salt as a processing aid, in at least one process step which is carried out before removal of the water from the coagulate of the emulsion polymer precipitated with the alkaline earth metal salt. For example, this may be accomplished in a method step upstream of the precipitation, such as the rubber polymerization and/or graft polymerization and/or during the precipitation itself (together with the alkaline earth metal salt) and/or after addition of the precipitant but chronologically before the removal of the water from the coagulate of the emulsion polymer.

The sodium salt is any sodium salt or a mixture of any sodium salts. The sodium salts used can be, for example, halides, sulfates, phosphates, nitrates and carbonates. The sodium salt is preferably selected from at least one representative of the group consisting of the salts of hydrochloric acid, sulfuric acid and phosphoric acid. The sodium salt is particularly preferably selected from sodium chloride and sodium sulfate.

Such sodium salts may also be formed during the precipitation from sodium salts of emulsifiers employed in the emulsion polymerization process by reaction with the alkaline earth metal salts used for the precipitation.

In a particularly preferred embodiment, the precipitation is effected using a mixed brine comprising at least one alkaline earth metal salt and at least one sodium salt and in a particularly preferred embodiment using a mixed brine comprising magnesium sulfate and at least one salt selected from sodium chloride and/or sodium sulfate and in a further preferred embodiment using a mixed brine comprising magnesium sulfate and sodium sulfate.

In the precipitation, the alkaline earth metal salts are preferably used as aqueous solutions (brines) having no other solid constituents.

If the sodium concentration in the precipitated product is too low, the sodium fraction in the precipitant (mixed brine) may be increased.

In an alternative, equally preferred embodiment, the emulsion polymer is initially precipitated using a brine of the alkaline earth metal salt and, in a downstream process step, a brine of a sodium salt is added before the coagulate is separated from the water by drying. Such a procedure is particularly advantageous and preferred if, as the sodium salt, a salt is used having an anion which, with the generally readily water-soluble alkaline earth metal salt used in the precipitation of the emulsion polymer, can form a poorly soluble and preferably non-hygroscopic magnesium salt. Preference is given, for example, to the sodium salts of phosphoric acid, particularly preferably sodium phosphate and/or disodium hydrogen phosphate.

The coagulate of the emulsion polymer can be dried, for example, by centrifugation, mechanical squeezing of the water, by heat-drying, for example in warm air or in warm inert gas, by spray-drying, by compounding with a polymer melt, for example a rubber-free vinyl(co)polymer in accordance with component B3, by degassing the compound melt in a vacuum or by a combination of several of these methods.

In a preferred embodiment, the graft polymer prepared by the emulsion polymerization process in accordance with component B1 comprises, as a result of the preparation, more than 100 ppm, preferably more than 200 ppm, in particular more than 400 ppm magnesium and/or calcium. In another preferred embodiment, the graft polymer prepared by the emulsion polymerization process in accordance with component B1 comprises, as a result of the preparation, less than 2000 ppm, particularly preferably less than 1500 ppm, in particular preferably less than 1000 ppm magnesium and/or calcium.

The content of alkali metal and akaline earth metal is determined as follows:

Approximately 200 mg of the sample to be investigated are weighed out and digested in nitric acid (5 mL). The digestion is carried out aided by microwaves at ca. 200 bar (total pressure of the digestion system) and ca.220°. The resulting solution is diluted with Millipore water and then measured by means of ICP-OES (inductively coupled plasma optical emission spectroscopy). For the quantification, a calibration series is prepared by dilution of certified reference materials.

Component A

Component A includes in principle all types of component B of various thermoplastic polymers or mixtures of two or more than two of such thermoplastic polymers.

Suitable examples here are polyolefins (such as polyethylene and polypropylene), thermoplastic polyurethanes, polyacetals (such as polyoxymethylene and polyphenylene ether), polyamides, polyimides, polycarbonates, polyesters, polyestercarbonates, polysulfones, polyarylates, polyaryl ethers, polyarylsulfones, polyaryl sulfides, polyether sulfones, polyphenylene sulfide, polyetherketones, polyamideimides, polyetherimides and polyesterimides.

As component A, particular preference is given to using at least one polymer selected from the group consisting of polycarbonate, polyestercarbonate and polyester, particularly preferably at least one polymer selected from the group consisting of aromatic polycarbonate, aromatic polyestercarbonate and aromatic polyester, most especially preferably a polymer selected from the group consisting of aromatic polycarbonate and aromatic polyester carbonate.

Aromatic polycarbonates and/or aromatic polyestercarbonates in accordance with component A which are suitable in accordance with the invention are known from the literature or preparable by processes known from the literature (for preparation of aromatic polycarbonates see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for preparation of aromatic polyestercarbonates, for example DE-A 3 077 934).

Aromatic polycarbonates are prepared, for example, by reacting diphenols with carbonic halides, preferably phosgene, and/or with aromatic dicarbonyl dihalides, preferably benzenedicarbonyl dihalides, by the interfacial process, optionally using chain terminators, for example monophenols, and optionally using trifunctional or more than trifunctional branching agents, for example triphenols or tetraphenols. Preparation is likewise possible via a melt polymerization process through reaction of diphenols with, for example, diphenyl carbonate.

Diphenols for preparation of the aromatic polycarbonates and/or aromatic polyestercarbonates are preferably those of the formula (I)

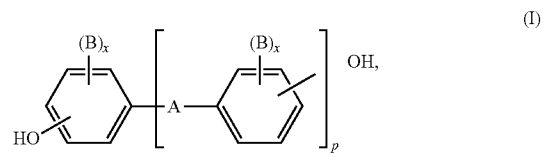

where
A is a single bond, C1 to C5-alkylene, C2 to C5-alkylidene, C5 to C6-cycloalkylidene, —O—, —SO—, —CO—, —S—, —SO2-, C6 to C12-arylene, onto which may be fused further aromatic rings optionally containing heteroatoms,
or a radical of the formula (II) or (III)

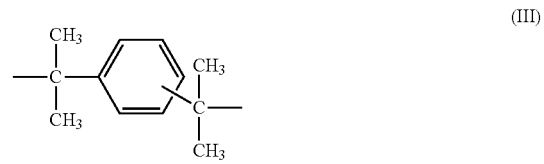

B in each case is C1 to C12-alkyl, preferably methyl, halogen, preferably chlorine and/or bromine,
x in each case is independently 0, 1 or 2,
P is 1 or 0, and
R5 and R6 can be chosen individually for each X1 and are each independently hydrogen or C1 to C6-alkyl, preferably hydrogen, methyl or ethyl,
X1 is carbon and
m is an integer from 4 to 7, preferably 4 or 5, with the proviso that R5 and R6 on at least one X1 atom are simultaneously alkyl.

Preferred diphenols are hydroquinone, resorcinol, dihydroxydiphenols, bis(hydroxyphenyl)-C1-C5-alkanes, bis(hydroxyphenyl)-C5-C6-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes, and the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3.3.5-trimethylcyclohexane, 4,4'-dihydroxydiphenyl sulfide, 4,4'-dihydroxydiphenyl sulfone and the di- and tetrabrominated or chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

It is possible to use the diphenols individually or in the form of any desired mixtures. The diphenols are known from the literature or obtainable by processes known from the literature.

Examples of chain terminators suitable for the preparation of the thermoplastic aromatic polycarbonates include phenol, p-chlorophenol, p-tert-butylphenol or 2,4,6-tribromophenol, but also longchain alkylphenols such as 4-[2-(2,4,4-trimethylpentyl)]phenol, 4-(1,1,3,3-tetramethylbutyl) phenol according to DE-A 2 842 005 or monoalkylphenols or dialkylphenols having a total of 8 to 20 carbon atoms in the alkyl substituents, such as 3,5-di-tert-butylphenol, p-isooctylphenol, p-tert-octylphenol, pdodecylphenol and 2-(3,5-dimethylheptyl)phenol and 4-(3,5-dimethylheptyl) phenol. The amount of chain terminators to be used is generally between 0.5 mol % and 10 mol %, based on the molar sum of the diphenols used in each case.

The thermoplastic aromatic polycarbonates preferably have mean weight-average molecular weights (Mw, measured by gel permeation chromatography in methylene chloride at 25° C. with polycarbonate as standard) of 20 000 to 40 000 g/mol, preferably 22 000 to 35 000 g/mol, more preferably 24 000 to 32 000 g/mol.

The thermoplastic aromatic polycarbonates may be branched in a known manner, preferably through the incorporation of 0.05 to 2.0 mol %, based on the sum total of the diphenols used, of trifunctional or more than trifunctional compounds, for example those having three or more phenolic groups.

Both homopolycarbonates and copolycarbonates are suitable. For preparation of inventive copolycarbonates in accordance with component A, it is also possible to use 1 to 25% by weight, preferably 2.5 to 25% by weight, based on the total amount of diphenols to be used, of polydiorganosiloxanes having hydroxyaryloxy end groups. These are known (U.S. Pat. No. 3,419,634) and are preparable by processes known from the literature. The preparation of polydiorganosiloxane-containing copolycarbonates is described in DE-A 3 334 782.

Preferred polycarbonates are, as well as the bisphenol A homopolycarbonates, the copolycarbonates of bisphenol A with up to 15 mol %, based on the molar sums of diphenols, of other diphenols specified as preferred or particularly preferred, especially 2,2-bis(3,5-dibromo-4-hydroxyphenyl) propane.

Aromatic dicarbonyl dihalides for preparation of aromatic polyestercarbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio between 1:20 and 20:1.

In the preparation of polyestercarbonates, a carbonic halide, preferably phosgene, is also additionally used as a bifunctional acid derivative.

Useful chain terminators for the preparation of the aromatic polyestercarbonates include, apart from the monophenols already mentioned, the chlorocarbonic esters thereof and the acid chlorides of aromatic monocarboxylic acids, which may optionally be substituted by C1 to C22-alkyl groups or by halogen atoms, and aliphatic C2 to C22-monocarbonyl chlorides.

The amount of chain terminators in each case is 0.1 to 10 mol %, based on moles of diphenol in the case of the phenolic chain terminators and on moles of dicarbonyl dichloride in the case of monocarbonyl chloride chain terminators.

The aromatic polyestercarbonates may also contain incorporated aromatic hydroxycarboxylic acids.

The aromatic polyestercarbonates may be either linear or branched in a known manner (see DE-A 2 940 024 and DE-A 3 007 934).

Branching agents used may, for example, be tri- or multifunctional carbonyl chlorides, such as trimesyl trichloride, cyanuric trichloride, 3,3',4,4'-benzophenonetetracarbonyl tetrachloride, 1,4,5,8-naphthalenetetracarbonyl tetrachloride or pyromellitic tetrachloride, in amounts of 0.01 to 1.0 mol % (based on dicarbonyl dichlorides used), or tri- or multifunctional phenols, such as phloroglucinol, 4,6-dimethyl-2,4,6-tri(4-hydroxyphenyl)hept-2-ene, 4,6-dimethyl-2,4-6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol %, based on diphenols used. Phenolic branching agents may be initially charged together with the diphenols; acid chloride branching agents may be introduced together with the acid dichlorides.

The proportion of carbonate structural units in the thermoplastic aromatic polyestercarbonates may vary as desired. Preferably, the proportion of carbonate groups is up to 100 mol %, especially up to 80 mol %, more preferably up to 50 mol %, based on the sum total of ester groups and carbonate groups. Both the ester fraction and the carbonate fraction of the aromatic polyestercarbonates may be present in the form of blocks or in random distribution in the polycondensate.

The thermoplastic aromatic polycarbonates and polyestercarbonates may be used alone or in any desired mixture.

Component B1

Component B1 comprises graft polymers prepared by an emulsion polymerization process of, in a preferred embodiment, B1.1) 5 to 95% by weight, preferably 10 to 70% by weight, more preferably 20 to 60% by weight, based on component B1, of a mixture of B1.1.1) 65 to 85% by weight, preferably 70 to 80% by weight, based on B1.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and B1.1.2) 15 to 35% by weight, preferably 20 to 30% by weight, based on B1.1, of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide) onto B1.2) 95 to 5% by weight, preferably 90 to 30% by weight, more preferably 80 to 40% by weight, based on component B1, of at least one elastomeric graft base.

The graft base preferably has a glass transition temperature of <0° C., further preferably <−20° C., more preferably <−60° C.

Glass transition temperatures, unless stated otherwise in the present invention, are determined by means of dynamic differential calorimetry (DSC) to the standard DIN EN 61006 at a heating rate of 10 K/min, with definition of the Tg as the midpoint temperature (tangent method), and nitrogen as protective gas.

The graft particles in component B1 preferably have a median particle size (D50) of 0.05 to 5 μm, preferably of 0.1 to 1.0 μm, more preferably of 0.2 to 0.5 μm.

The median particle size D50 is the diameter with 50% by weight of the particles above it and 50% by weight below it. It is determined, unless explicitly stated otherwise in the present application, by means of ultracentrifuge measurement (W. Scholtan, H. Lange, Kolloid, Z. and Z. Polymere [Polymers] 250 (1972), 782-1796).

Preferred monomers B1.1.1 are selected from at least one of the monomers styrene, α-methylstyrene and methyl methacrylate; preferred monomers B1.1.2 are selected from at least one of the monomers acrylonitrile, maleic anhydride and methyl methacrylate.

Particularly preferred monomers are B1.1.1 styrene and B1.1.2 acrylonitrile.

Graft bases B1.2 suitable for the graft polymers B1 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting).

Preferred graft bases B1.2 are diene rubbers (for example based on butadiene or isoprene), diene-vinyl block copolymer rubbers (for example based on butadiene and styrene blocks), copolymers of diene rubbers with further copolymerizable monomers (for example according to B1.1.1 and B1.1.2) and mixtures of the aforementioned rubber types. Particular preference is given to pure polybutadiene rubber and styrene-butadiene block copolymer rubber.

The gel content of the graft polymers is at least 40% by weight, preferably at least 60% by weight, more preferably at least 75% by weight (measured in acetone).

The gel content of the graft polymers is, unless stated otherwise in the present invention, determined at 25° C. as the insoluble fraction in acetone as the solvent (M. Hoffmann, H. Krömer, R. Kuhn, Polymeranalytik I and II [Polymer Analysis I and II], Georg Thieme-Verlag, Stuttgart 1977).

The graft polymers B1 are prepared by free-radical polymerization.

The graft polymer B1 generally comprises, as a result of the preparation, free copolymer, i.e. copolymer not chemically bound to the rubber base, of B1.1.1 and B1.1.2, which is notable in that it can be dissolved in suitable solvents (e.g. acetone).

Preferably, component B1 contains a free copolymer of B1.1.1 and B1.1.2 which has a weight-average molecular weight (Mw), determined by gel permeation chromatography with polystyrene as standard, of preferably 30 000 to 150 000 g/mol, more preferably 40 000 to 120 000 g/mol.

Component B2

Component B2 of the compositions according to the invention may optionally comprise graft polymers prepared by the bulk, suspension or solution polymerization process, A preferred embodiment in this case comprises graft polymers of B2.1) 5 to 95% by weight, preferably 80 to 93% by weight, more preferably 85 to 92% by weight, most preferably 87 to 93% by weight, based on component B2, of a mixture of B2.1.1) 65 to 85% by weight, preferably 70 to 80% by weight, based on the mixture B2.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and B2.1.2) 15 to 35% by weight, preferably 20 to 30% by weight, based on the mixture B2.1, of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide) onto B2.2) 95 to 5% by weight, preferably 20 to 7% by weight, more preferably 15 to 8% by weight, most preferably 13 to 7% by weight, based on component B2, of at least one graft base.

The graft base preferably has a glass transition temperature of <0° C., preferably <−20° C., more preferably <−60° C.

The graft particles in component B2 preferably have a median particle size (D50) of 0.1 to 10 μm, preferably of 0.2 to 2 μm, particularly preferably of 0.3 to 1.0 μm, most preferably of 0.3 to 0.6 μm.

Preferred monomers B2.1.1 are selected from at least one of the monomers styrene, α-methylstyrene and methyl methacrylate; preferred monomers B2.1.2 are selected from at least one of the monomers acrylonitrile, maleic anhydride and methyl methacrylate.

Particularly preferred monomers are B2.1.1 styrene and B2.1.2 acrylonitrile.

Graft bases B2.2 suitable for the graft polymers B2 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting).

Preferred graft bases B2.2 are diene rubbers (for example based on butadiene or isoprene), diene-vinyl block copolymer rubbers (for example based on butadiene and styrene blocks), copolymers of diene rubbers with further copolymerizable monomers (for example according to B2.1.1 and B2.1.2) and mixtures of the aforementioned rubber types. Particularly preferred graft bases B2.2 are styrene-butadiene block copolymer rubbers and mixtures of styrene-butadiene block copolymer rubbers with pure polybutadiene rubber.

The gel content of the graft polymers B2 is preferably 10 to 35% by weight, more preferably 15 to 30% by weight, most preferably 17 to 23% by weight (measured in acetone).

Particularly preferred polymers B2 are, for example, ABS polymers prepared by free-radical polymerization, which, in a preferred embodiment, contain up to 10% by weight, particularly preferably up to 5% by weight, most preferably 2 to 5% by weight, based in each case on the graft polymer B2, of n-butyl acrylate.

The graft polymer B2 generally comprises, as a result of the preparation, free copolymer, i.e. copolymer not chemically bound to the rubber base, of B2.1.1 and B2.1.2, which is notable in that it can be dissolved in suitable solvents (e.g. acetone).

Preferably, component B2 contains free copolymer of B2.1.1 and B2.1.2 which has a weight-average molecular weight (Mw), determined by gel permeation chromatography with polystyrene as standard, of preferably 50 000 to 200 000 g/mol, more preferably of 70 000 to 150 000 g/mol, more preferably of 80 000 to 120 000 g/mol.

Component B3

The composition may optionally comprise, as a further component B3, (co)polymers of at least one monomer from the group of the vinylaromatics, vinyl cyanides (unsaturated nitriles), (C1 to C8)-alkyl (meth)acrylates, unsaturated carboxylic acids and derivatives (such as anhydrides and imides) of unsaturated carboxylic acids.

Especially suitable as component B3 are (co)polymers of

B3.1 50 to 99% by weight, preferably 65 to 85% by weight, more preferably 70 to 80% by weight, based on the (co)polymer B3, of at least one monomer selected from the group of the vinylaromatics (for example styrene, α-methylstyrene), ring-substituted vinylaromatics (for example p-methylstyrene, p-chlorostyrene) and (C1-C8)-alkyl (meth)acrylates (for example methyl methacrylate, n-butyl acrylate, tert-butyl acrylate) and B3.2 1 to 50% by weight, preferably 15 to 35% by weight, more preferably 20 to 30% by weight, based on the (co)polymer B3, of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers B3 are resinous, thermoplastic and rubber-free. Particular preference is given to the copolymer of B3.1 styrene and B3.2 acrylonitrile.

(Co)polymers B3 of this kind are known and can be prepared by free-radical polymerization, especially by emulsion, suspension, solution or bulk polymerization.

The (co)polymers B3 have a weight-average molecular weight (Mw), determined by gel permeation chromatography with polystyrene as standard, of preferably 50 000 to 200 000 g/mol, more preferably of 70 000 to 150 000 g/mol, more preferably of 80 000 to 130 000 g/mol.

Component C

The composition may optionally comprise other commercially available polymer additives as component C.

Useful commercial polymer additives as per component C include additives such as, for example, flame retardants (for example phosphorus or halogen compounds), flame retardant synergists (for example nanoscale metal oxides), smoke-inhibiting additives (for example boric acid or borates), antidripping agents (for example compounds from the substance classes of the fluorinated polyolefins, the silicones and aramid fibers), internal and external lubricants and demolding agents (for example pentaerythrityl tetrastearate, montan wax or polyethylene wax), flowability aids (for example low molecular weight vinyl (co)polymers), antistats (for example block copolymers of ethylene oxide and propylene oxide, other polyethers or polyhydroxy ethers, polyetheramides, polyesteramides or sulfonic salts), conductivity additives (for example conductive carbon black or carbon nanotubes), stabilizers (for example UV/light stabilizers, thermal stabilizers, antioxidants, transesterification inhibitors, hydrolysis stabilizers), antibacterial additives (for example silver or silver salts), scratch resistance-improving additives (for example silicone oils or hard fillers such as (hollow) ceramic beads or quartz powder), IR absorbents, optical brighteners, fluorescent additives, fillers and reinforcers (e.g. talc, ground glass or carbon fibers, (hollow) glass or ceramic beads, mica, kaolin, $CaCO_3$ and glass flakes), acids, and dyes and pigments (for example carbon black, titanium dioxide or iron oxide), or else mixtures of a plurality of the additives mentioned.

In a preferred embodiment, the inventive compositions each comprise, as component C, at least one component selected from the group of the demolding agents and stabilizers. In a particularly preferred embodiment, the demolding agent used is pentaerythrityl tetrastearate. In a particularly preferred embodiment, the stabilizer used is at least one compound selected from the group of the sterically hindered phenols, the organic phosphites and the Brønsted-acidic compounds.

As component C, the inventive compositions may especially also comprise flame retardants, for example halogenated organic compounds or phosphorus-containing flame retardants. The latter are used with preference.

Phosphorus-containing flame retardants in the sense of the invention are preferably selected from the groups of the mono- and oligomeric phosphoric and phosphonic esters, phosphonate amines and phosphazenes, and it is also possible to use mixtures of a plurality of compounds selected from one or more than one of these groups as flame retardants. It is also possible to use other halogen-free phosphorus compounds that have not been mentioned here specifically, alone or in any desired combination with other halogen-free phosphorus compounds.

Preferred mono- and oligomeric phosphoric and phosphonic esters are phosphorus compounds of the general formula (IV)

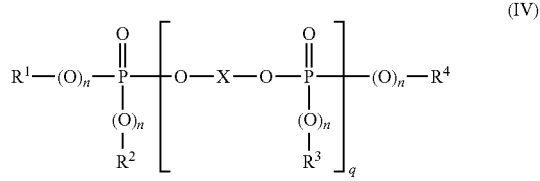

where

R1, R2, R3 and R4 are each independently optionally halogenated C1 to C8-alkyl, in each case optionally alkyl-substituted, preferably C1 to C4-alkyl-substituted, and/or halogen-substituted, preferably chlorine or, bromine-substituted, C5 to C6-cycloalkyl, C6 to C20-aryl or C7 to C12-aralkyl, n is independently 0 or 1 q is 0 to 30 and

X is a mono- or polycyclic aromatic radical having 6 to 30 carbon atoms, or a linear or branched aliphatic radical having 2 to 30 carbon atoms, which may be OH-substituted and may contain up to 8 ether bonds.

Preferably, R1, R2, R3 and R4 are each independently C1 to C4-alkyl, phenyl, naphthyl or phenyl-C1-C4-alkyl. The aromatic R1, R2, R3 and R4 groups may in turn be substituted by halogen and/or alkyl groups, preferably chlorine, bromine and/or C1 to C4-alkyl. Particularly preferred aryl radicals are cresyl, phenyl, xylenyl, propylphenyl or butylphenyl, and the corresponding brominated and chlorinated derivatives thereof.

X in the formula (IV) is preferably a mono- or polycyclic aromatic radical having 6 to 30 carbon atoms. The latter preferably derives from diphenols of the formula (I).

n in the formula (IV) may independently be 0 or 1; n is preferably 1.

q represents values from 0 to 30. When mixtures of different components of the formula (IV) are used, it is possible to use mixtures preferably having number-average q values of 0.3 to 10, more preferably 0.5 to 10, especially 1.05 to 1.4.

X is more preferably

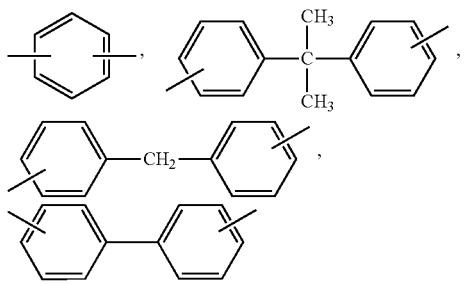

or the chlorinated or brominated derivatives thereof; more particularly, X derives from resorcinol, hydroquinone, bisphenol A or diphenylphenol. More preferably, X derives from bisphenol A.

The use of oligomeric phosphoric esters of the formula (IV) which derive from bisphenol A is particularly advantageous since the compositions modified with this phosphorus compound have a particularly high stress-cracking and hydrolysis resistance, and a particularly low tendency to form deposits in the course of processing by injection molding. In addition, it is possible with these flame retardants to achieve a particularly high heat distortion resistance.

Inventive component C used may be monophosphates (q=0), oligophosphates (q=1-30) or mixtures of mono- and oligophosphates.

Monophosphorus compounds of the formula (IV) are especially tributyl phosphate, tris(2-chloroethyl)phosphate, tris(2,3-dibromopropyl)phosphate, triphenyl phosphate, tricresyl phosphate, diphenyl cresyl phosphate, diphenyl octyl phosphate, diphenyl 2-ethylcresyl phosphate, tri(isopropylphenyl)phosphate, halogen-substituted aryl phosphates, dimethyl methylphosphonate, diphenyl methylphosphonate, diethyl phenylphosphonate, triphenylphosphine oxide or tricresylphosphine oxide.

The phosphorus compounds of the formula (IV) are known (cf., for example, EP-A 363 608, EP-A 640 655) or can be prepared in an analogous manner by known methods (e.g. Ullmanns Enzyklopädie der technischen Chemie [Ullmann's Encyclopedia of Industrial Chemistry], vol. 18, p. 301 ff. 1979; Houben-Weyl, Methoden der organischen Chemie [Methods of Organic Chemistry], vol. 12/1, p. 43; Beilstein vol. 6, p. 177).

The mean q values can be determined by using a suitable method (gas chromatography (GC), high pressure liquid chromatography (HPLC), gel permeation chromatography (GPC)) to determine the composition of the phosphate mixture (molecular weight distribution) and using this to calculate the mean values for q.

Phosphonate amines are preferably compounds of the formula (V)

$$A_{3-y}\text{-}NB_{1y} \quad (V)$$

in which
A is a radical of the formula (Va)

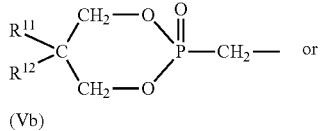

(Vb)

R11 and R12 are each independently unsubstituted or substituted C1-C10-alkyl or unsubstituted or substituted C6 to C10-aryl, R13 and R14 are each independently unsubstituted or substituted C1-C10-alkyl or unsubstituted or substituted C6 to C10-aryl or R13 and R14 together are unsubstituted or substituted C3 to C10-alkylene, Y denotes the numerical values 0, 1 or 2 and B1 is independently hydrogen, optionally halogenated C2 to C8-alkyl, unsubstituted or substituted C6 to C10-aryl.

B1 is preferably independently hydrogen, ethyl, n- or isopropyl, which may be substituted by halogen, unsubstituted or C1 to C4-alkyl- and/or halogen-substituted C6 to C10-aryl, especially phenyl or naphthyl.

Alkyl in R11, R12, R13 and R14 is independently preferably methyl, ethyl, n-propyl, isopropyl, n-, iso-, sec- or tert-butyl, pentyl or hexyl.

Substituted alkyl in R11, R12, R13 and R14 is preferably independently halogen-substituted C1 to C10-alkyl, especially mono- or disubstituted methyl, ethyl, n-propyl, isopropyl, n-, iso-, sec- or tert-butyl, pentyl or hexyl.

C6 to C10-aryl in R11, R12, R13 and R14 is preferably independently phenyl, naphthyl or binaphthyl, especially o-phenyl, o-naphthyl, o-binaphthyl, which may be substituted by halogen (generally mono-, di- or trisubstituted).

R13 and R14 together with the oxygen atoms to which they are bonded directly and the phosphorus atom may form a ring structure.

Preferred examples include: 5,5,5',5',5'',5''-hexamethyl-tris(1,3,2-dioxaphosphorinanemethane)amino-2,2',2,-trioxide of the formula (Va-1)

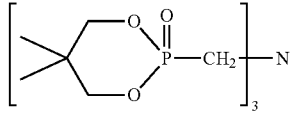

1,3,2-dioxaphosphorinane-2-methanamine, N-butyl-N-[(5,5-dimethyl-1,3,2-dioxaphosphorinan-2-yl)methyl]-5,5-dimethyl-, P,2-dioxide; 1,3,2-dioxaphosphorinane-2-methanamine, N-[[5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinan-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5- dichloromethyl-1,3,2-dioxaphosphorinan-2-yl)-methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane-2-methanamine, N,N-di(4-chlorobutyl)-5,5-dimethyl-2-oxide; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P2-dioxide.

Preference is further given to:
compounds of the formula (Va-2) or (Va-3)

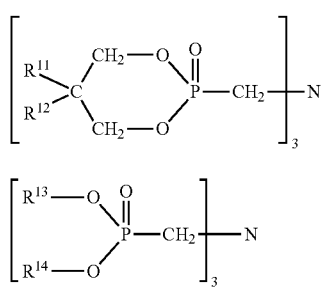

where
R11, R12, R13 and R14 are each as defined above.

Particular preference is given to compounds of the formula (Va-2) and (Va-1). The preparation of the phosphonate amines is described, for example, in US-PS 5 844 028.

Phosphazenes are compounds of the formulae (VIa) and (VIb)

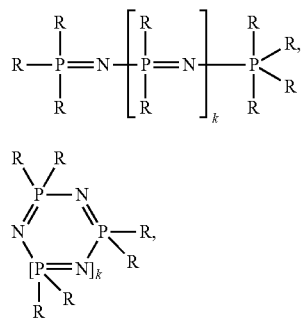

where
R is the same or different in each case and is amino, in each case optionally halogenated, preferably fluorinated, C1 to C8-alkyl, or C1 to C8-alkoxy, in each case optionally alkyl-substituted, preferably C1 to C4-alkyl-substituted, and/or halogen-substituted, preferably chlorine- and/or bromine-substituted, C5 to C6-cycloalkyl, C6 to C20-aryl, preferably phenyl or naphthyl, C6 to C20-aryloxy, preferably phenoxy, naphthyloxy, or C7 to C12-aralkyl, preferably phenyl-C1-C4-alkyl,
k is 0 or a number from 1 to 15, preferably a number from 1 to 10.

Examples include propoxyphosphazene, phenoxyphosphazene, methylphenoxyphosphazene, aminophosphazene and fluoroalkylphosphazenes. Preference is given to phenoxyphosphazene.

The phosphazenes can be used alone or in a mixture. The R radical may always be the same, or 2 or more radicals in the formulae (VIa) and (VIb) may be different. Phosphazenes and the preparation thereof are described, for example, in EP-A 728 811, DE-A 1 961668 and WO 97/40092.

The flame retardants can be used alone or in any desired mixture with one another, or in a mixture with other flame retardants.

In addition, flame-retardant compositions, in a preferred embodiment, comprise the aforementioned flame retardants in combination with at least one antidripping agent selected from the substance classes of the fluorinated polyolefins, the silicones and aramid fibers. Particular preference is given to using polytetrafluoroethylene polymers as antidripping agents.

Production of the Molding Compositions and Moldings

The inventive thermoplastic molding compositions are produced by mixing the respective constituents in a known manner and compounding and extruding them in the melt at temperatures of 180° C. to 350° C., preferably of 220 to 320° C., more preferably of 230 to 300° C., in standard apparatus such as internal kneaders, extruders and twin-shaft screw systems.

The individual constituents can be mixed in a known manner, either successively or simultaneously, and either at about 20° C. (room temperature) or at a higher temperature.

In a preferred embodiment, in a first step, component B1 or a portion of component B1 is first reacted with component B3 or a portion of component B3 to give a pre-compound and, in a second step, the inventive composition is produced using the pre-compound thus produced.

In a particularly preferred embodiment, in the first step, the graft polymer B1 or a portion of component B1 is compounded with component B3 or a portion of component B3 to give a low-emission pre-compound by means of compounding under vacuum devolatilization. It is particularly advantageous to use component B1 in the moist state (i.e. in the presence of water) in this devolatilizing compounding operation. Processes of this kind are described, for example, in EP 0 768 157 A1 and EP 0 867 463 A1. Particularly suitable pre-compounds are those wherein the total content of volatile organic compounds is less than 1000 mg/kg, preferably less than 800 mg/kg, especially less than 500 mg/kg. In the second process step, the other constituents and the pre-compound are mixed in a known manner and compounded or extruded in the melt at the aforementioned temperatures in standard apparatus such as internal kneaders, extruders and twin-shaft screw systems. In a preferred embodiment, in this second compounding step, for the purpose of further devolatilization to remove volatile constituents (for example residual monomers and residual solvents), a pressure of <500 mbar, preferably <400 mbar, especially <200 mbar (absolute) is applied.

The invention therefore also provides a method for producing low-emission inventive compositions.

The inventive molding compositions can be used for production of moldings of any kind. These can be produced by injection molding, extrusion and blow-molding processes. A further form of processing is the production of moldings by thermoforming from previously produced sheets or films.

Examples of moldings of this kind are films, profiles, all kinds of housing parts, for example for domestic appliances such as juice presses, coffee machines, mixers; for office equipment such as monitors, flatscreens, notebooks, printers, copiers; sheets, tubes, electrical installation ducts, windows, doors and further profiles for the construction sector (interior fitting and exterior applications), and also electrical and electronic parts such as switches, plugs and sockets, and also bodywork and interior components for utility vehicles, especially for the automotive sector.

More particularly, the inventive molding compositions can also be used, for example, for production of the following molding or molded parts: interior fitting components for rail vehicles, ships, aircraft, buses and other motor vehicles, housing for electrical appliances containing small-scale transformers, housing for information processing and transmission devices, housing and lining for medical appliances, massage appliances and housing therefor, children's toy vehicles, flat wall elements, housing for safety devices, thermally insulated transport containers, moldings for sanitary and bathroom equipment, cover grids for blower vents and housing for garden appliances.

The compositions according to the invention are also particularly suitable for preparing moldings or molded parts having Class A surface requirements and high-gloss finish, which optionally have been subjected partially or fully to a further surface treatment step, for example, by lacquering, in-mold coating of foils, metallization via vacuum depositing or electroplating.

In the context of the present invention, "high-gloss" is understood to mean a gloss level determined by reflection in accordance with DIN 67530 at a measuring angle of 60° of at least 95, preferably of at least 97, particularly preferably of at least 99. The invention therefore also relates to moldings or molded parts of the compositions according to the invention having full or partial high-gloss finish, which optionally have been subjected partially or fully to a further surface treatment step, for example, by lacquering, in-mold coating of foils, metallization via vacuum depositing or electroplating.

EXAMPLES

Component A1

Linear polycarbonate based on bisphenol A having a weight-average molecular weight $M_w$ of 28 kg/mol (determined by GPC in methylene chloride at 25° C. with polycarbonate as standard).

Component B1-1

Pre-compound composed of 50% by weight of a graft polymer of the ABS type, prepared by the emulsion polymerization process, having an A:B:S ratio of 12:50:38% by weight and 50% by weight of a styrene-acrylonitrile copolymer, prepared by the bulk polymerization process, having a styrene-acrylonitrile ratio of 76:24% by weight and having a weight-average molecular weight $M_w$ of 100 kg/mol, measured by GPC in dimethylformamide at 20° C. with polystyrene as standard. The graft polymer used for preparation of the pre-compound was precipitated in basic medium using magnesium sulfate as precipitant and comprises, as a result of the preparation, alkali metals and alkaline earth metals 680 ppm magnesium, 15 ppm calcium, 130 ppm potassium and 35 ppm sodium.

The content of alkali metals and alkaline earth metals in the emulsion graft polymers was determined in accordance with component B1-1 and B1-2 as described above.

Component B1-2

Pre-compound composed of 50% by weight of a graft polymer of the ABS type, prepared by the emulsion polymerization process, having an A:B:S ratio of 12:54:34% by weight and 50% by weight of a styrene-acrylonitrile copolymer, prepared by the bulk polymerization process, having a styrene-acrylonitrile ratio of 76:24% by weight and having a weight-average molecular weight $M_w$ of 100 kg/mol, measured by GPC in dimethylformamide at 20° C. with polystyrene as standard. The graft polymer used for preparation of the pre-compound was precipitated in basic medium using magnesium sulfate as precipitant and comprises, as a result of the preparation, alkali metals and alkaline earth metals 700 ppm magnesium, 10 ppm calcium, 100 ppm potassium and 110 ppm sodium.

Component B2 n-Butyl acrylate-modified graft polymer of the ABS type, prepared by the bulk polymerization process, having an A:B:S ratio of 21:10:65% by weight and an n-butyl acrylate content of 4% by weight. The D50 of the graft particle diameters determined by ultracentrifugation is 0.5 μm. The parent graft base of the graft polymer is a styrene-butadiene block copolymer rubber (SBR). The gel content of the graft polymer measured in acetone is 20% by weight. The weight-average molecular weight $M_w$, measured by GPC with polystyrene as standard in dimethyl-formamide at 20° C., of the free n-butyl acrylate-modified SANs, i.e. not chemically bound to the rubber or included in the rubber particles in acetone insoluble form, is 110 kg/mol.

Component B3

Styrene-acrylonitrile copolymer, prepared by the bulk polymerization process, having a styrene-acrylonitrile ratio of 76:24% by weight and having a weight-average molecular weight $M_w$ of 100 kg/mol, measured by GPC in dimethylformamide at 20° C. with polystyrene as standard.

Component C1

Pentaerythrityl tetrastearate as lubricant/demolding agent

Component C2

Phosphorous ester of bis(2-hydroxy-3-cyclohexyl-5-methylphenyl)methane having the formula

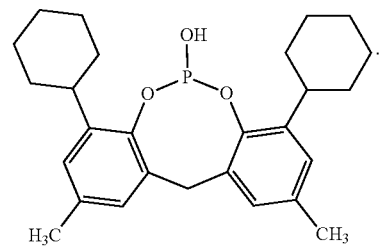 [SMILES: Cc1cc2c(c(C3CCCCC3)c1)OP(O)Oc1c(cc(C)cc1C1CCCCC1)C2]

Component C3

Thermal stabilizer, Irganox 1076, BASF (Ludwigshafen, Germany)

Production of the Test Specimens and Testing

The compositions were prepared on a Coperion Werner & Pfleiderer ZSK25 twin-screw extruder (Stuttgart, Germany) at a melt temperature of 260° C. and with application of a reduced pressure of 100 mbar (absolute). The granules resulting from the respective compounding operations were processed in an injection molding machine (from Arburg) at melt temperatures of 260° C. and a mold temperature of 80° C. to give sheets of dimension 150 mm×105 mm×2 mm. In this case, a high-gloss polishing tool was used.

These sheets were exposed directly after the injection molding (i.e. without further surface treatment/coating steps) at 40° C. and 90° C. in air at a relative humidity of at least 95% for 3 days.

Subsequently a visual scoring was conducted by 3 independent appraisers in a manner analogous to the evaluation scheme for assessing the degree of blistering according to amount and size, said scheme is described in DIN EN ISO 4628-2. According to DIN EN ISO 4628-2, the degree of blistering is evaluated using an assessment with the "xSy"

nomenclature, where x represents the number of blisters and y represents their size. Pictorial standards for degrees of blistering are presented in DIN EN ISO 4628-2, with x and y being each independently from 2-5, which serve as calibration for the visual assessment. Damage which shows fewer visible blister defects stated as x=2 in DIN EN ISO 4628-2 is assessed as x=1. Analogously, damage which shows smaller, but still visible unaided (magnifier/microscope), blister defects stated in DIN EN ISO 4628-2 as y=2, is assessed as y=1. An assessment of "0" is applied when no blister defects are visible unaided.

TABLE 1

Examples

| | Example 1 | Comparative Example 1 |
|---|---|---|
| Composition | | |
| A1 | 60.35 | 60.35 |
| B1-1 | | 23.16 |
| B1-2 | 23.16 | |
| B2 | 8.90 | 8.90 |
| B3 | 6.53 | 6.53 |
| C1 | 0.74 | 0.74 |
| C2 | 0.12 | 0.12 |
| C3 | 0.20 | 0.20 |
| Na/Mg | 0.17 | 0.05 |
| Na/(Mg + Ca) | 0.16 | 0.05 |
| Properties | | |
| Assessment after storage under warm humid conditions at 40° C. | 0 | 1S1-2S2 |
| Assessment after storage under warm humid conditions at 90° C. | 1S1 | 2S2-3S3 |

The invention claimed is:

1. A polymer composition comprising
   A) 0 to 98 parts by weight, based on the sum total of A and B, of a thermoplastic polymer or a mixture of a plurality of thermoplastic polymers different from B,
   B) 2 to 100 parts by weight, based on the sum total of A and B, of
      B1) at least one graft polymer prepared by the emulsion polymerization process,
      B2) optionally at least one graft polymer prepared by the bulk, suspension or solution polymerization process,
      B3) optionally at least one rubber-free vinyl (co)polymer, and
   C) 0 to 30 parts by weight of at least one commercially available polymer additive, wherein the sum total of parts by weight A and B is 100, wherein
      (i) the graft polymer prepared by the emulsion polymerization process in accordance with component B1 was precipitated with at least one alkaline earth metal salt selected from the group consisting of magnesium and calcium salts in basic medium (pH>7), and
      (ii) the graft polymer prepared by the emulsion polymerization process in accordance with component B1 comprises, as a result of the preparation, at least one sodium salt and at least one alkaline earth metal salt in accordance with (i),
         wherein the metal ions are present in a molar ratio Na/(Mg+Ca) of at least 0.10 and at most 1.0.

2. The polymer composition of claim 1, comprising:
   A) 1 to 95 parts by weight, based on the sum total of A and B,
   B) 5 to 99 parts by weight, based on the sum total of A and B, and
   C) 0.1 to 20 parts by weight, based on the sum total of A and B.

3. The polymer composition of claim 1, comprising:
   A) 30 to 85 parts by weight, based on the sum total of A and B,
   B) 15 to 70 parts by weight, based on the sum total of A and B, and
   C) 0.3 to 7 parts by weight, based on the sum total of A and B.

4. The polymer composition of claim 1, wherein the graft polymer in accordance with the component B1 comprises sodium and at least one element selected from the group consisting of calcium and magnesium, in a molar ratio Na/(Mg+Ca) of at least 0.15 and at most 0.5.

5. The polymer composition of claim 1, wherein component B1 comprises more than 100 ppm and less than 2000 ppm magnesium and/or calcium.

6. The polymer composition of claim 1, wherein the magnesium or calcium salts are selected from the group consisting of sulfates and chlorides.

7. The polymer composition of claim 1, wherein the alkaline earth metal salt is magnesium sulfate.

8. The polymer composition of claim 1, wherein the sodium salt in the component B1 is selected from the group consisting of the sodium sulfate, sodium chloride and sodium salts of phosphoric acid.

9. The polymer composition of claim 2, wherein the composition comprises, as component C, at least one representative selected from the group consisting of flame retardants, flame retardant synergists, smoke-inhibiting additives, antidripping agents, internal and external lubricants and demolding agents, flowability aids, antistats, conductivity additives, UV/light stabilizers, thermal stabilizers, antioxidants, transesterification inhibitors, hydrolysis stabilizers, antibacterial additives, scratch resistance-improving additives, IR absorbents, optical brighteners, fluorescent additives, fillers and reinforcers, acids, and dyes and pigments.

10. The polymer composition of claim 1, wherein the component B comprises at least two components selected from the group consisting of the B1, the B2 and the B3.

11. The polymer composition of claim 2, wherein the thermoplastic polymer in accordance with the component A is selected from the group consisting of polycarbonates, polyester carbonates, polyesters and mixtures thereof.

12. A molding and/or molded part formed from the polymer composition of claim 1 having a class A surface and a partial or full high-gloss finish, comprising a gloss level in high-gloss regions of the part of at least 95, determined by reflection in accordance with DIN 67530 at a measuring angle of 60.

13. The molding and/or molded part of claim 12, wherein the part is subjected partially or fully to a further surface treatment.

14. The molding and/or molded part of claim 13, wherein the further surface treatment is by lacquering.

15. The molding and/or molded part of claim 13, wherein the further surface treatment is by in-mold coating of foils.

16. The molding and/or molded part of claim 13, wherein the further surface treatment is by metallization via vacuum depositing and/or electroplating.

17. The molding and/or molded part of claim 12, further comprising an evaluation of "0" with respect to size and number of blisters in accordance with DIN EN ISO 4628-2 after storage under warm humid conditions at 40° C. and 95% relative humidity.

18. The molding and/or molded part of claim 12, further comprising an evaluation of "1S1" with respect to size and number of blisters in accordance with DIN EN ISO 4628-2 after storage under warm humid conditions at 90° C. and 95% relative humidity.

* * * * *